United States Patent Office 3,629,278
Patented Dec. 21, 1971

3,629,278
PREPARATION OF IMIDAZOLINE COMPOUNDS BY PYROLYSIS OF N,N'-DIACYLALKYLENE-DIAMINES
Paul L. Bachman, Parlin, N.J., assignor to Merck & Co., Inc., Rahway, N.J.
No Drawing. Filed Sept. 20, 1968, Ser. No. 761,305
Int. Cl. C07d 49/34
U.S. Cl. 260—309.6     4 Claims

ABSTRACT OF THE DISCLOSURE

N,N'-diformylalkylenediamines having nitrogen atoms on adjacent carbons of the general formula

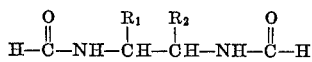

are heated in the presence of calcium oxide to form imidazolines of the general formula

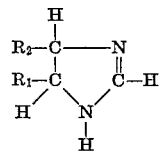

where $R_1$ and $R_2$ are hydrogen, alkyl or aralkyl. The imidazolines are converted to their corresponding imidazoles by dehydrogenation in the presence of a copper catalyst.

BACKGROUND OF THE INVENTION

Field of the invention

The present invention relates to the preparation of imidazolines and their dehydrogenation to imidazoles and more particularly relates to a process for the synthesis of 2-unsubstituted imidazolines and their conversion, in the presence of a copper catalyst, to the corresponding imidazoles.

Description of the prior art 2-alkylimidazolines have been previously prepared by heating diacylethylenediamine alone or with reagents such as hydrogen chloride, caustic soda, calcium oxide, magnesia, magnesium, zinc and sodium. However, prior art workers have not been able to obtain 2-unsubstituted imidazolines from diformylalkylenediamines. Imidazolines are conventionally converted to their corresponding imidazoles by vapor phase dehydrogenation in the presence of a noble metal catalyst.

Imidazoles are aromatic in character, have high boiling points and undergo typical aromatic reactions such as nitration, chlorination and diazo coupling. The compounds are generally amphoteric forming salts with both acids and metals and exhibit a good degree of chemical stability. They are useful chemical intermediates for the preparation of pharmaceutical and agricultural chemicals such as nitroimidazoles useful as germicides and antiprotozoa agents.

SUMMARY OF THE INVENTION

The general purpose of this invention is to provide a method for preparing 2-unsubstituted imidazolines and their corresponding imidazoles, by heating a diformylalkylenediamine in the presence of calcium oxide followed by dehydrogenation of the resulting imidazoline in the presence of a copper catalyst. The present invention provides a unique route to imidazolines and imidazoles having hydrogen at the two-position. Pyrolysis in the presence of calcium oxide provides a process which, for the first time, yields 2-unsubstituted imidazolines from diformylalkylenediamines. Dehydrogenation by vapor phase techniques or by a novel liquid phase conversion in the presence of a copper catalyst gives the corresponding imidazole.

An object of the present invention is to provide a liquid phase technique for converting diformylalkylenediamines to imidazolines and imidazoles.

A further object of the invention is to provide a process for preparing imidazolines, having hydrogen at the two-position, from diformylalkylenediamines by pyrolysis in the presence of CaO.

Still a further object of the invention is to provide a liquid phase process for dehydrogenating imidazolines in the presence of a copper catalyst.

DESCRIPTION OF THE PREFERRED EMBODIMENTS 2-unsubstituted imidazolines are prepared by the process of this invention by heating N,N'-diformylalkylenediamine in the presence of calcium oxide. The 2-unsubstituted imidazolines are converted to the corresponding imidazole by heating in the presence of a copper catalyst. The over-all process of forming the N,N'-diformylalkylenediamine, its pyrolysis to an imidazoline, and the subsequent dehydrogenation to an imidazole is as follows:

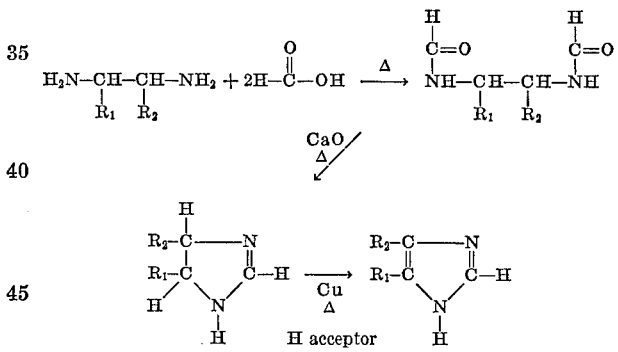

The alkylenediamine substituents $R_1$ and $R_2$ are hydrogen, loweralkyl such as methyl, ethyl, propyl, butyl or the like; or aralkyl, such as 2-phenethyl, benzyl or the like. Representative of the alkylenediamines are ethylenediamine, propylenediamine-1,2, butylenediamine-2,3, 1-phenethylpropylenediamine-1,2, 2-benzylethylenediamine, 1-phenylnonylenediamine-2,3 or the like.

The alkylenediamine and the formic acid are reacted by heating to form the diamide. If desired an acyl halide, acid anhydride, amide or ester may be reacted with the diamine to form the diamide. In any case the N,N'-diformylalkylenediamines of the general formula above, where $R_1$ and $R_2$ are as previously described, are prepared by recognized procedures. It should be noted that $R_1$ and $R_2$ may be the same or differing substituents.

In accordance with the present invention, N,N-'diformylalkylenediamines are pyrolyzed in the presence of calcium oxide to form 2-unsubstituted imidazolines. The process is carried out by mixing the N,N'-diformylalkylenediamine with at least a one-half molar amount of calcium oxide and heating to a temperature sufficient to melt the diacyldiamine. Excess CaO may be employed if desired but does appreciably improve yield and in large excess may interfere with the recovery of product. The reaction temperature will vary depending upon the initial reactants, but in general a temperature between 150°–300° C. is sufficient. The reactants are preferably heated to a temperature between 170°–240° C. The melting of the diformylalkylenediamine reactant and the reaction is preferably carried out under a pressure of less than 200 mm. Hg to reduce polymerization and charring. The 2-unsubstituted imidazoline product formed is allowed to distill from the reaction mixture and is collected by a condenser system. During the reaction the pressure may be further reduced to aid recovery of the product. Completion of the reaction is indicated by a lack of product distilling from the reaction mixture. The collected distillate product is heated for several hours at reduced pressure to remove any alkylenediamine which may result from decomposition of the N,N'-diformylalkylenediamine.

Alternatively, in preparing high boiling imidazolines the N,N'-diformylalkylene diamine is heated in the presence of calcium oxide, under the temperature conditions described above and the imidazoline extracted from the reaction mixture with a suitable organic solvent such as benzene, chloroform, methylenechloride or the like. The solvent may then be removed by vacuum distillation. The recovered product may be distilled to improve purity.

Representative examples of imidazolines prepared by the process of this invention are: imidazoline, 4(5)-methylimidazoline, 4(5) - ethylimidazoline, 4-methyl-5-ethylimidazoline, 4,5-dihexylimidazoline, 4(5)-benzylimidazoline, 4(5) - phenethylimidazoline, 4-benzyl-5-methylimidazoline, 4,5-dibenzylimidazoline and the like.

The 2-unsubstituted imidazolines are dehydrogenated to the corresponding imidazoles by mixing the imidazoline with a suitable hydrogen acceptor solvent such as nitrobenzene and a copper catalyst such as cupric oxide, cuprous oxide, copper chromite, cadmium copper chromite, Raney copper, and the like. The mixture is heated at a temperature between 95° C. and reflux for up to 4 hours, preferably for 1–3 hours.

From 1–100 ml. of solvent and from 30 mg. to 3 g. of copper catalyst are preferably employed for each gram of 2-unsubstituted imidazoline to be dehydrogenated. Preferably there is used about 5–15 ml. of solvent and 150–450 mg. of copper catalyst for each gram of imidazoline to be converted.

The 2-unsubstituted imidazoles are isolated by diluting the reaction mixture with ether and extracting with water or dilute acids such as hydrochloric acid. The aqueous phase is concentrated and/or neutralized to recover the product. The imidazole compound may be further purified by distillation or crystallization.

The invention is illustrated, but not limited by the following specific example of the preparation of the imidazolines and the corresponding imidazoles.

EXAMPLE 80 g. N,N'-diformylethylenediamine and 20 g. calcium oxide are heated at 180°–230° C. at a vacuum of 100 mm. Hg until all the N,N'-diformylethylenediamine is melted. Heating is continued, the pressure is lowered to 1–5 mm. Hg and the distillate collected. Toward the end of the reaction the pressure is lowered to 0.25 mm. Hg. The distillate condenses on cooling, resembling immobile glass. The distillate is heated for 1–4 hours at 90°–95° C., under aspirator pressure, to remove ethylenediamine. 25–35 g. of colorless, immobile oil, at least 94% imidazoline by assay, is recovered.

1.0 g. of imidazoline is dissolved in 10 ml. of nitrobenzene. 250 mg. cupric oxide is added and the mixture refluxed with stirring for 2 or 3 hours. The refluxed mixture is diluted with ether, extracted with water and imidazole recovered by distilling. Yields from 25–35% of imidazole are obtained.

As in the above example, one mole of N,N'-diformylbutylenediamine-1,2 is pyrolyzed at 200° C. and 100 mm. Hg in the presence of 0.6 mole CaO. 4(5)-ethylimidazoline is distilled, collected and dissolved in one liter of nitrobenzene. 45 g. of cuprous oxide is added and the entire mixture heated at 180° C. for 2 hours to give 4(5)-ethylimidazole.

In a similar manner one mole of N,N'-diformyl-1-phenylpropylenediamine-2,3 is pyrolyzed at 220° C. and 150 mm. Hg with 0.55 mole of calcium oxide. The product, 4(5)-benzylimidazoline, is allowed to distill over, is condensed and collected. Collected product is mixed with 100 g. of copper chromite in 1.5 liters of nitrobenzene and heated at reflux for 1 hour to give 4(5)-benzylimidazole.

The present invention provides a novel liquid phase conversion of N,N'-diformylalkylenediamines to imidazoles. Pyrolysis of N,N' - diformylalkylenediamines provides means for producing imidazolines having hydrogen at the two-position. The invention further provides a copper catalyzed liquid phase dehydrogenation of the imidazolines to their corresponding imidazoles.

Obviously, many modifications and variations of the present invention are possible in the light of the above teachings. It is therefore to be understood that, within the scope of the appended claims, the invention may be practiced otherwise than as specifically described.

I claim:
1. A process for preparing a 2-unsubstituted imidazoline which comprises heating at a temperature of from 150 to 300° C. at a pressure of less than 200 mm. Hg, in the presence of calcium oxide, a N,N'-diformylethylenediamine of the formula:

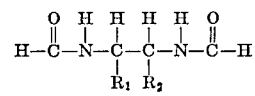

wherein $R_1$ and $R_2$ are each hydrogen, loweralkyl, and phenylloweralkyl.

2. The process of claim 1 in which $R_1$ and $R_2$ are hydrogen.

3. The process of claim 1 in which the calcium oxide is present in at least a one-half molar equivalent for each mole of the N,N'-diformylethylene diamine.

4. The process of claim 1 in which the temperature of the reaction is maintained at from 170 to 240° C.

References Cited

UNITED STATES PATENTS

| 2,399,601 | 4/1946 | Kyrides et al. | 260—309 |
| 2,404,299 | 7/1946 | Kyrides et al. | 260—309 |
| 2,404,300 | 7/1946 | Kyrides et al. | 260—309 |
| 2,847,417 | 8/1958 | Erner | 260—309 |
| 3,255,200 | 6/1966 | Green | 260—309 |

FOREIGN PATENTS

| 484,862 | 5/1938 | Great Britain | 260—309 |

OTHER REFERENCES

Hofmann: Imidazole and its Derivatives, Part I, page 214, N.Y., Interscience, 1953, QD401.H6.

Schipper et al.: In: Elderfield Heterocyclic Compounds, volume 5, pages 209 and 240, N.Y., Wiley, 1957, QD400. E4.

NATALIE TROUSOF, Primary Examiner

U.S. Cl. X.R.

260—309